Patented Nov. 26, 1940

2,223,280

UNITED STATES PATENT OFFICE 2,223,280

HECTOGRAPH MASS AND METHOD OF PREPARING COPIES THEREFROM

Howard E. Collins, La Grange, Ill., assignor to Ditto, Incorporated, Chicago, Ill., a corporation of West Virginia No Drawing. Application January 31, 1938, Serial No. 187,910

1 Claim. (Cl. 101—149.5)

This invention relates to hectograph gelatinous masses and to methods of preparing copies therefrom.

The ordinary hectograph composition is composed mainly of a gelatinous substance such as gelatine or glue, combined with glycerine and water. The proportions are chosen so as to give maximum strength, with flexibility and good copying characteristics. A suitable composition may contain glue or gelatine, 30 parts by weight, water 45 parts, and glycerine 300 parts.

The preparation of copies from hectograph compositions by the ordinary hectograph process is generally carried out about as follows: A design formed of a soluble dye is applied to a sheet to form a master copy. The design on the master copy is then contacted with a hectograph pad whereupon the dye of the design is largely transferred to the hectograph mass. Copies are then made by contacting copy sheets with the hectograph mass.

In accordance with my invention, I associate with a hectograph mass a liquid which is a better solvent for the transfer dye of the design on a master copy than the glycerine-water mixtures present in the glycerine-water type of hectograph compositions heretofore employed. The hectograph mass containing the aforesaid type of solvent is then used to produce copies in the same manner as for an ordinary hectograph mass.

I may associate the solvent with the hectograph mass by incorporating it in the hectograph composition itself, or by moistening the surface of the hectograph composition with the solvent prior to the application of the master copy.

I prefer to use a volatile solvent and apply it to the surface of the hectograph composition, just prior to contacting the composition with the master copy. Because of the volatility of the dye solvents applied, the formation of the dye retentive and absorptive surface film is temporary and reversible and will consequently not result in any change of the desirable properties of the hectograph mass which have been obtained by carefully balancing tht proportions of the ingredients.

As an example of suitable dye solvents, the following are given: ethyl alcohol, methyl alcohol, propyl alcohol, acetone, ethyl acetate, methyl acetate, ethylene glycol monoethyl ether (Cellosolve) and methy Cellosolve. Any one or a combination of these solvents may be used.

I also may mix with these volatile solvents suitable solvents of less volatility, such as glycol, carbitol, or substantially anhydrous glycerine. In this manner a relatively permanent surface film may be produced, formed of solvents of low water content.

My invention is particularly applicable to the preparation of transfer copies having designs formed of black dyes such as a basic nigrosine or other extremely light absorbent combination of basic colors, for example, a mixture of fuchsin and malachite green in proportion of about 1:2. These dyes have only a slight solubility in water and in the glycerine-water mixtures hitherto used in hectograph masses. Largely because of this, it has, up to now, not been practical to use carbon paper or ribbon containing these dyes in connection with hectograph compositions. My invention makes it possible to use these dyes with hectograph compositions, allowing the preparation of a large number of clear and distinct copies.

Having thus described the invention, what I desire to secure by Letters Patent is:

The process of making transfer copies in which a design formed from a soluble dye selected from the group consisting of basic nigrosines and mixtures of fuchsin and malachite green is contacted with a hectograph composition and a copy sheet thereafter contacted with the hectograph composition to transfer the design to the copy sheet, the step of moistening the hectograph composition with acetone.

HOWARD E. COLLINS.